J. CAPPEL AND C. R. EDWARDS.
NUT LOCK.
APPLICATION FILED MAY 2, 1921.

1,428,753.

Patented Sept. 12, 1922.

Inventors:
J. Cappel,
C. R. Edwards,
By L. M. Thurlow
Atty

Patented Sept. 12, 1922.

1,428,753

UNITED STATES PATENT OFFICE.

JOSEPH CAPPEL AND CLIFFORD R. EDWARDS, OF PEORIA, ILLINOIS.

NUT LOCK.

Application filed May 2, 1921. Serial No. 466,163.

*To all whom it may concern:*

Be it known that we, JOSEPH CAPPEL and CLIFFORD R. EDWARDS, citizens of the United States, residing at Peoria, in the county of Peoria and State of Illinois, have invented certain new and useful Improvements in Nut Locks; and we do hereby declare that the following is a full, clear, and exact description of the invention, which will enable others skilled in the art to which it appertains to make and use the same.

This invention relates to new and useful improvements in lock nuts particularly adapted for use for securing the nuts on bolts used in machine construction.

An object of our invention is to provide an exceedingly effective means for locking the nut on a machine bolt so that it cannot loosen or drop therefrom due to vibrations or jarring, but which can be readily removed when desired.

Another object is to furnish a nut-lock, the construction of whose parts provides a very positive locking means that cannot get out of order, that in no way weakens the parts on which it is used, that is very simple in its appointments and entirely automatic in action, and that is so arranged that no dirt or dust can enter and interfere with the working thereof.

To the end that the invention may be clearly understood, the accompanying drawing has been provided wherein.

The nut is designated at 1 which may be square, hexagonal, or other form, and 2 is the bolt with which it is used, the same having one or more longitudinal grooves in its surface.

Figure 1:
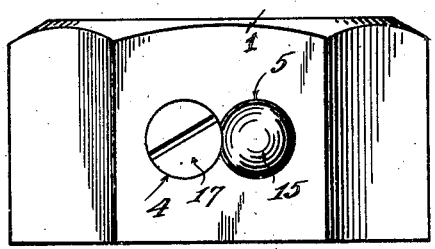
Figure 1 is a side elevation of a nut with the invention applied thereto.

One face of the nut is furnished with a pair of sockets 4, 5 created by drilling into the nut in the direction of the bolt 2. These are preferably drilled in such manner as to communicate with one another as shown particularly in Figure 1.

In providing these sockets or holes, one is carried to a slightly greater depth than the other thereby leaving a bridging portion or shoulder at 6.

A second smaller bore 7 is furnished in the bottom of the socket 4 which is carried entirely through the metal, opening into the threaded bore that receives said bolt 2.

Figure 4:
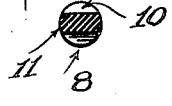
Figure 4 is a transverse section of a locking element.
Figure 6:
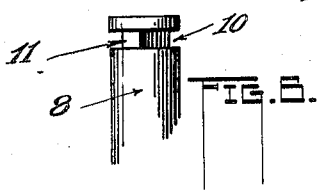
Figure 6 shows, in perspective, part of the locking element illustrated in Figures 2, 3, and 4.

8 is a latch, cylindrical in form, beveled at one end as 9. At its other end, it is furnished with a groove 10, the resulting neck 11 being flattened, as shown in Figure 4.

Figure 5:
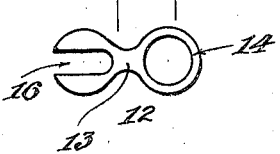
Figure 5 is a plan of one of the parts.

12 is a sheet-metal plate, preferably a stamping, which is shown in Figure 5, having a dumbbell form in general outline.

Figure 2:
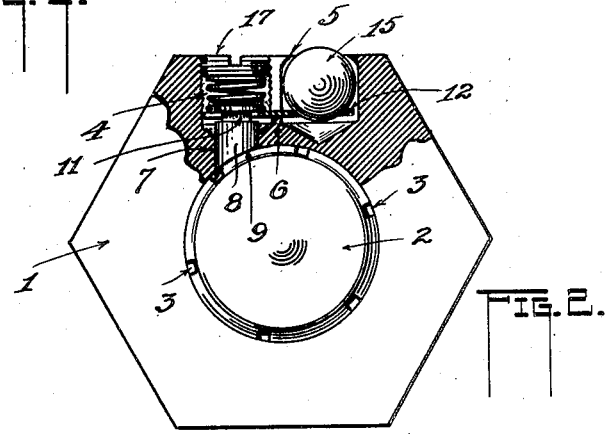
Figure 2 shows one of the faces of the nut with part broken away to show the construction and the engagement with the bolt, also shown.
Figure 3:
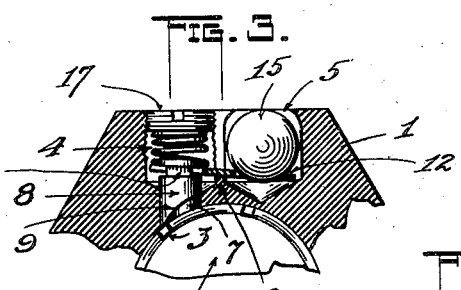
Figure 3 is a similar view of part of the nut shown in Figure 2, wherein the parts are illustrated in another position.

The neck 13 thereof is adapted to lie upon the bridging portion or shoulder 6, Figures 2 and 3, and one end has the form of a ring 14 within which is seated a ball 15 which lies within the socket 5. The other end of the plate has an open slot, or notch 16, and receives the flattened neck 11 of the latch 8.

17 is a short screw or threaded cap adapted to close the socket 4, there being a spiral spring 18 interposed between said screw and the end of the plate 12 having the notch 16.

The pointed end of the latch 8 created by beveling the latter, as explained, is so disposed that by pressure of the spring 18 behind it, it will be held elastically in any one of the grooves 3 of the bolt 2 preventing the nut "backing up" relatively to the latter, but at the same time, will permit the said nut to be tightened upon said bolt.

Figures 2 and 3 show, respectively, the engaged and disengaged positions of the latch.

In practice, the ball 15 is permitted to project slightly beyond the face of the nut, Figure 2, and in order to prevent said ball from leaving the socket 5 in which it lies, the metal around the said socket is slightly closed inwardly by the use of the punch, for example, to reduce the size of the opening as drilled.

The nut is readily removed in applying a wrench thereto, since when the latter is used in such a way that the face of said nut from which the ball protrudes is engaged, said ball will be depressed, the latch 8 being automatically retracted in so doing.

As will be seen, the entire structure is entirely simple in its makeup and reliable at all times. And the fact that it is wholly enclosed in the nut and that the sockets 4, 5 are closed at the face of the nut, no dirt can enter to prevent proper operation, and at the same time a drop of oil applied to the ball will enter the cavity holding the parts and prevent rusting besides keeping such parts in free working condition.

We claim:

1. In combination, a bolt having a groove extending longitudinally of its threaded portion, and a nut for said threaded portion having a recess in one of its faces part of which extends into the threaded bore, there being a ridge in said nut at substantially the middle of the recess, a latch in the recess adapted to engage the groove of the bolt, a member resting between its ends on said ridge and at one end engaging the latch, and extending at its other end into the part of said recess opposite that having said latch, and a spring constantly tending to force the latch into the groove.

2. In combination, a bolt having a groove extending longitudinally of its threaded portion, and a nut for said threaded portion having a recess in one of its faces part of which extends into the threaded bore, there being a ridge in said nut at substantially the middle of the recess, a latch in the recess adapted to engage the groove of the bolt, a member resting between its ends on said ridge and at one end engaging the latch, and extending at its other end into the part of said recess opposite that having said latch, a closure for that part of the recess having the latch, and a spring interposed between the closure and the latch.

3 In combination, a nut, and a bolt with which it engages, the latter having a groove in its threaded surface, extending longitudinally thereof, there being a recess in one of the faces of the nut, there being a bore connecting the recess with the threaded bore of said nut, a member seated in said recess fulcrumed between its ends, a latch lying in the first named bore engaging one end of the member, a spring constantly tending to move the latch in the direction of the bolt, and means in said recess engaging the other end of the member to operate the latch in opposition to the spring.

4. In combination, a nut having a recess in one of its faces extending in the direction of the threaded bore thereof, a bore connecting the recess with said threaded bore, a latch lying within the first named bore adapted to enter the said threaded bore, a spring constantly tending to move the latch toward and into the last named bore, a member fulcrumed between its ends in said recess and carrying at one end the said latch, and a part lying in said recess operatively engaging the other end of the member and in position to be engaged by a wrench.

5. In combination, a nut having a recess in one of its faces extending in the direction of the threaded bore thereof, a bore connecting the recess with said threaded bore, a latch lying within the first named bore adapted to enter the said threaded bore, a removable device secured in the face of the nut, a spring interposed between the device and the latch constantly tending to move the latch toward and into the last named bore, a member fulcrumed between its ends in said recess and carrying at one end the latch, and a part lying in said recess operatively engaging the other end of the member and in position to be engaged by a wrench said part and said device adapted to form a complete closure for the said recess at the face of said nut.

6. In combination, a nut having a recess in one of its faces extending in the direction of the threaded bore thereof, said nut in the bottom of the bore including a raised portion substantially midway of the said recess, there being a bore in the bottom of the recess at one side of the said raised portion connecting the recess with the said threaded bore, a latch slidable in the connecting bore, a member fulcrumed between its ends on the raised portion, and at one end carrying the latch, and a ball lying within part of the recess engaging the other end of the member, a spring constantly tending to move the latch into the said threaded bore and to normally maintain the periphery of the ball outward beyond the face of the nut, and a device adapted together with the ball to form a complete closure for the recess at said face of the nut.

7. In combination, a bolt having a groove extending longitudinally of its threaded portion, and a nut for said threaded portion having a recess in one of its faces part of which extends into the threaded bore, there being a ridge in said nut at substantially the middle of the recess, a latch in the recess adapted to engage the groove of the bolt, a member resting between its ends on said ridge and at one end angaging the latch, and extending at its other end into the part of the recess opposite that having said latch, a closure for that part of the recess having the latch, a spring interposed between the closure and the latch, and a part resting upon the member at its other end and normally extending beyond the face of said nut.

In testimony whereof we affix our signatures in presence of two witnesses.

JOSEPH CAPPEL.
CLIFFORD R. EDWARDS.

Witnesses:
J. H. KINGSBURY,
L. M. THURLOW.